March 10, 1942.  W. D. HALL  2,275,899
THERMAL DEMAND ATTACHMENT FOR METERS
Filed Nov. 9, 1939

Inventor:
William D. Hall,
by Harry E. Dunham
His Attorney.

Patented Mar. 10, 1942

2,275,899

UNITED STATES PATENT OFFICE 2,275,899

THERMAL DEMAND ATTACHMENT FOR METERS

William D. Hall, Elkins, W. Va., assignor to General Electric Company, a corporation of New York Application November 9, 1939, Serial No. 303,637

4 Claims. (Cl. 171—34)

My invention relates to demand meters and in particular to a thermal demand meter as an attachment to another meter such as an integrating watthour meter. According to my invention, I provide a small low cost demand meter that may be attached to the ordinary terminals of a watthour meter without additional wiring to give an indication of demand, utilizing available space existing in the ordinary watthour meter so that no changes in construction or dimensions are necessary in such watthour meter. My demand measuring attachment may be added to existing watthour meters by merely removing the watthour meter cover, replacing the conventional terminal short circuiting strip of such meter with my demand meter attachment, and then replacing the watthour meter cover. The indicating pointer of my demand meter extends forward of the meter terminals below the watthour meter and may be read through the glass cover of the watthour meter without obstructing clear visibility to other watthour meter parts.

I prefer to employ a demand meter operating on the thermal principle and in such cases my demand meter is advantageously protected from direct rays of the sun, where, for example, the meter is installed out-of-doors, because the demand meter is positioned to the rear and below the watthour meter structure.

Figure 1:
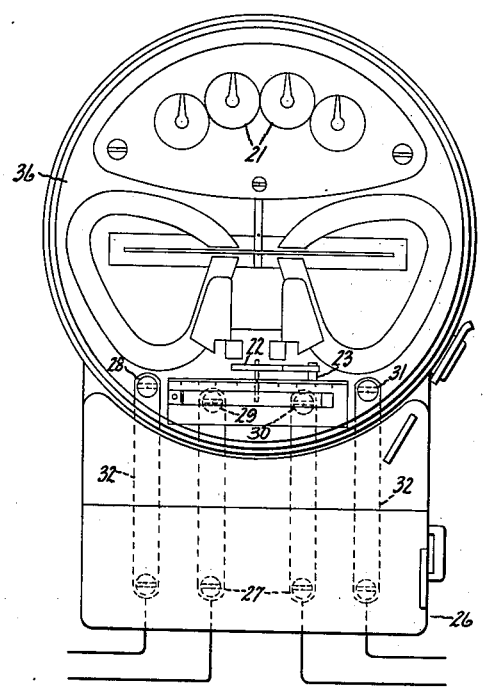
Figure 2:
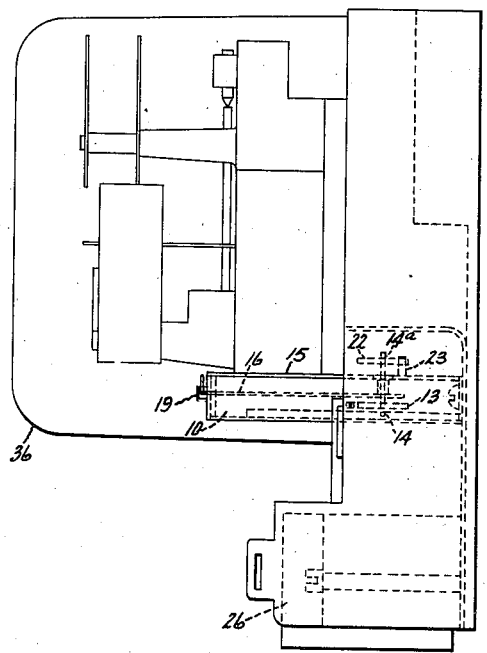
Figure 3:
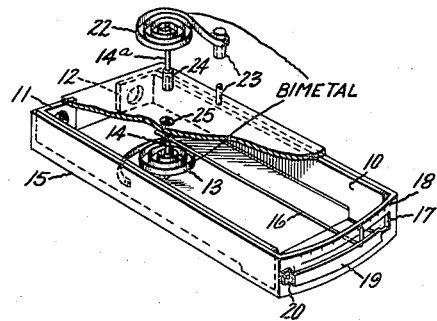
Figure 5:
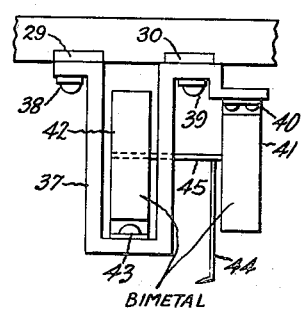
Figure 4:
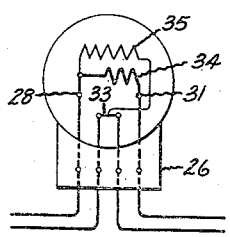

My thermal demand meter is preferably compensated for ambient temperature changes and a construction and location particularly adapted for such compensation will be described. The features of my invention which are believed to be novel and patentable will be pointed out in the claims appended hereto. For a better understanding of my invention reference is made in the following description to the accompanying drawing in which Fig. 1 represents a front view of the conventional glass cover watthour meter with my demand meter attached thereto. Fig. 2 represents a side view of such combination with invisible portions of my thermal demand meter indicated in dotted outline. Fig. 3 represents a partially exploded perspective view of my thermal demand meter per se with a cover section thereof partially broken away. Fig. 4 represents the usual connections of a single phase watthour meter, and Fig. 5 represents a modified form of demand meter support.

Fig. 3 represents a preferred form of thermal demand meter used with my invention. 10 represents a U-shaped heater strip that is substantially non-inductive to sixty cycle currents and through which the metered current flows between terminals 11 and 12. Between the legs of strip 10 is a bi-metallic spiral 13 having its outer end fastened to the inner side of one leg of strip 10 and its inner end secured to a shaft 14. Spiral 13 upon being heated tends to uncoil and hence to turn shaft 14 counter-clockwise as viewed in Fig. 3. It is confined within an insulating casing or box 15 to conserve the heat which is generated in the box when current flows through heater strip 10. Hence spiral 13 is suitably arranged to respond to the heating effect of current flow through strip 10 to rotate shaft 14 counter-clockwise in proportion to such current flow. This response is, of course, not instantaneous as it will require some little time for the parts to become heated and as the interior of the box becomes hotter in comparison to the surrounding atmosphere, there will be a corresponding increase in heat transfer through the walls of the box 15. Hence, there is a suitable time lag in the heating response and the parts are proportioned in relation to the normal expected current flow and demand response desired to produce a response proportional to average current demand over a substantial time interval such as fifteen minute periods. Such thermal demand measurement principle is well-known. Shaft 14 has secured to it a pointer 16 which extends forward through a narrow slit 17 in the front end of the box where the pointer may cooperate with a demand scale 18 marked on the curved front of the box. Hence, the pointer will deflect to the right and up scale in proportion to the current demand.

In order to semi-permanently register a demand which reaches or exceeds a given value, I provide a light catch spring 19 which has its down scale end secured to the front of the box 15 at 20 and extends up scale just outside of the path of travel of pointer 16. Spring 19 is curved inwardly so that pointer 16 does not touch it until the pointer approaches near the free or up scale end of the spring and then the pointer lightly rubs against the spring and pushes it outward slightly. When the pointer moves beyond the free end of the spring, the latter moves inward beside the pointer and then acts as a catch to prevent return of the pointer down scale.

When used with a watthour meter such as shown in Fig. 1, the meter reader, when he takes down the monthly reading of the watthour register 21, will note the position of the demand pointer 16, and if it is caught in the up scale position by spring catch 19, it is an indication that sometime during the preceding month the predetermined average current demand has been exceeded. The meter reader notes this and it may be taken into consideration in calculating the customer's bill or possibly the indication is used merely as information to the power company that the customer's rate or meter or wiring should be changed to accommodate the load thus exceeded. The pointer may be reset so as to move down scale as permitted by the load, by merely pulling out the free end of spring 19 very slightly after the indication has served its purpose. That portion of the target or indicator end of the pointer which is hidden by spring 19, except when the target moves out from behind the spring, may be painted red or have any other distinguishing mark thereon which is seen only when the pointer is in an advanced position beyond the spring. Thus the appearance of the pointer when in a down scale position is readily distinguished from the latched-in or advanced position. In fact the spring may be made to hide the target entirely until it moves from behind the spring.

In order to compensate the demand meter for changes in ambient temperature, a second bimetallic thermal responsive spiral 22 is provided and secured between shaft 14a and a stationary support 23 mounted on the box cover. Shafts 14 and 14a are coupled together to form a continuous shaft. Spiral 22, when heated, tends to turn shaft 14a clockwise or its action is opposed to that of spiral 13 and the opposed actions are equal when the temperatures of the two spirals are equal. Spiral 22, however, is located outside of box 15 and hence is influenced only by changes in ambient temperature. Thus the device is compensated for ambient temperature changes.

In Fig. 3 the temperature compensating spiral and its end supporting parts are shown lifted above their normal positions to better illustrate the manner in which the parts are assembled during installation. When assembled, shaft 14a is connected to shaft 14 by a telescoping coupling indicated at 24, and the two parts 23 forming the support for the outer end of spiral 22 likewise telescope together. The lower male part of this support 23 is fastened to and extends above the upper wall of casing 15. An opening 25 for the shaft 14—14a is also provided in the upper wall of the casing 15. These telscoping parts are designed to fit together with a tight fit and when pressed together, need no further fastening means. Their assembled relation is indicated in Fig. 2. The reason for thus making the shaft in two parts will be better understood after explaining the construction and manner of assembly of the casing 15.

Casing 15 is a one piece box of molded insulating material open at its rear end. It is dimensioned and shaped to slide onto the U-shaped heater strip 10 from front to rear with a sufficiently tight fit to hold the box securely in place without other holding means. In order to slide the box in place, the shaft 14 must have a length less than the internal depth of the box and is connected to the outer spiral 22 and shaft section 14a only after the casing has been slid into place over heater strip 10. The assembled shaft 14—14a has no bearings as such, but is entirely rotatively supported in place by the inner ends of the two spirals 13 and 22. In sliding the box 15 into place on heater strip 10, the forward end of pointer 16 is allowed to come through opening 17 and then the target at the pointer end may be attached or formed as by bending the end of the pointer upward.

The rear end of the box is partially closed by the inwardly bent terminals 11 and 12 and when in place with these terminals bolted to the terminals of a meter terminal block, the box is entirely closed at its rear end. Figs. 1 and 4 represent usual connections of a single phase bottom connected watthour meter. Such meters have a terminal chamber 26 extending downward beneath the rear portion of the watthour meter casing. There are terminals 27 in the terminal chamber for connecting to the line and load and there are terminals 28—31 in the watthour meter casing proper for connection to the meter coils. Connectors 32 join the two sets of terminals. The current coil 34 of the watthour meter is connected between the outer terminals 28 and 31 in series with one side of the line. The voltage coil 35 is connected between terminal 28 and a bar 33 which connects terminals 29 and 30. Bar 33 is in series with the other side of the line which is brought into the meter in order to make the voltage connection and for other reasons. While I have described the connections for the usual single phase two wire meter, other bottom connected meters have terminals placed in general as above explained and they can be readily adapted to support and energize my demand meter as herein explained. The example of my demand meter here represented is adapted to be entirely supported on the meter terminals at 29 and 30 inside of the watthour meter casing. To install the demand meter the connector strip 33 of Fig. 4 is removed and the heater strip 10 is inserted and bolted in its place, the demand meter terminals 11 and 12 being spaced and dimensioned to fit the meter connecting terminals at 29 and 30. This, of course, connects the heater strip in series with the line and the same current which passes through the current winding of the watthour meter passes through the heater strip 10, although the coil and strip are in this example in different sides of the line.

To install my demand meter on an existing watthour meter one may proceed as follows. Remove the glass cover 36 and the connector 33 of the watthour meter. Next bring the U-shaped strip 10 with its shaft 14, spiral 13 and pointer 16 into position and connect the strip 10 in place of the removed connector 33. The terminal screws for this purpose are accessible at this time because the cover box 15 of the demand meter has not yet been put on. The voltage coil terminal of the meter is reconnected at one of the terminals at 29 or 30. Next, the cover 15 is slid on to heater strip 10 and pushed up tight against the meter terminal block. Pointer 16 is adjusted and the target thereon formed. Then the upper shaft section 14a and its spiral 22 are added and secured in place to complete the assembly. In coupling the shaft sections together, care is taken to see that their relative rotary positions correspond to a previously calibrated condition. The pointer is examined to see that it swings sufficiently free and the latch spring 19 is adjusted if necessary. If desired, a final calibration of the demand meter may be made as installed. This should be done with the glass cover of the watthour meter in place.

It is seen that the thermal demand meter is entirely supported from the meter terminals which are used to connect the demand meter in the circuit, that the device may be readily installed on existing watthour meters without interfering with the calibration, accessibility, or visibility of such meters. The demand meter has few rugged small parts and is therefore low in cost, easy to assemble and calibrate, and is not likely to get out of order.

Another important feature of the combination is that the thermal elements of the demand meter are well to the rear and below the watthour meter structure and these parts are therefore shaded from the direct and reflected rays of the sun in cases where the watthour meter is installed out-of-doors such that the sun may shine through the glass cover of the watthour meter. While the interior of the watthour meter may vary considerably in ambient temperature due to variation in sunlight, the change in ambient temperature within the watthour meter casing is taken care of by the compensating spiral 22. This spiral 22, however, cannot be erratically heated by the sun rays because it is well shaded and hence conforms to the true ambient within the watthour meter casing under all conditions and hence is enabled to correctly perform its compensating function.

It is desirable that the compensating spiral 22 remain uncovered and exposed to the air within the watthour meter casing, but this would not be practicable if positioned where the sun's rays could strike it. For sudden changes in ambient temperature external to the watthour meter for any reason, there is some tendency for the spiral 14 to change its temperature faster than the compensating spiral 22 because of the heat transfer from the exterior to the interior of the watthour meter through the metal service wires directly to terminals of heater strip 10. That is, under extreme conditions, this heat transfer through the wires may be faster than through the glass cover of the meter. If, under such circumstances, the compensating spiral 22 were also enclosed in a box, it would require even longer to reach a true ambient temperature. It is for this reason that it is desirable that the compensating spiral 22 be directly exposed to the air currents that may occur within the watthour meter.

It has been previously proposed to provide a thermal demand meter on the register 21 of the watthour meter. This exposes the thermal demand meter more or less directly to sunlight and requires extra wiring from the meter terminals to such demand meter. With my invention these disadvantages are avoided.

I do not confine my invention to any particular way of mounting my demand meter on the meter terminals and in Fig. 5 I have indicated another mounting arrangement that may be used. In this case the heater strip 37 has outwardly turned terminals 38 and 39 spaced to fit the meter terminals 29 and 30. An extension 40 of this heater strip is provided for supporting the compensating spiral 41. The current heated spiral 42 lies between the legs of the heater strip 37 and is supported thereby at 43. This spiral will be enclosed by a box as previously described, but omitted from Fig. 5 for the sake of clearness. The pointer 44 is secured to a shaft 45 connecting the centers of the two spirals. As thus arranged, the pointer 44 will swing in a vertical arc instead of a horizontal arc, as in Fig. 3. In both examples, the heater strips are substantially noninductive, in that they offer little or no reactance to the flow of currents having frequencies in the order of sixty cycles per second. This is a desirable feature.

As has been stated, at a predetermined current, such as say five amperes, the pointer 16 will require just fifteen minutes to pass beyond and be latched by spring 19. With prior art methods of calibration, it is necessary to take 15 minutes to calibrate devices of the general character I have described.

I have found that by passing say ten amperes through the device for only one or two minutes, then immediately reducing the current to five amperes and holding it at this latter value for several minutes, the pointer will have reached its substantial ultimate value and the calibration may be then checked. Hence it is possible, by by method, to check the calibration much faster than with prior art methods.

What I claim as new and desire to secure by Letters Patent of the United States is:

1. In combination, a watthour meter structure, a casing therefor having a cup-shaped glass cover, a terminal chamber extending beneath the rear portion of said casing, connections for said meter including terminals in the terminal chamber connected to meter terminals in the lower back portion of said casing, a thermal demand measuring device within said casing comprising a U-shaped heater strip supported on and connected in series relation with said meter terminals, a bimetallic spiral heated by said heater strip, an enclosure for said strip and spiral, a second bimetallic spiral subject to the ambient temperature within said casing, a shaft connecting and supported by said spirals arranged to be rotated by the resultant opposed torques of said spirals in response to their temperatures, and a demand indicator visible through the glass cover from the front thereof rotated by said shaft.

2. In combination, a watthour meter structure, a casing therefor having a cup-shaped glass cover, meter terminals in said casing to the rear and beneath said structure, and a current demand maesuring device within said casing supported on and energized through said meter terminals, said device comprising a U-shaped heater strip connected between two meter terminals, an enclosure about said heater strip, a pair of bimetallic, thermally responsive spirals, one within and one without said enclosure, a shaft connecting and supported by the centers of said spirals and rotated thereby in response to the difference in their temperatures, and a demand indicating pointer extending forward from said shaft and visible through the glass cover from the front thereof.

3. A thermal demand meter comprising a heater element in the form of a U-shaped strip of conductor material having the extremities of its legs turned at right angles to form terminals lying in a common plane, said terminals having bolt openings for connecting said heater in an electric circuit and mechanically supporting said meter, a casing of insulating material dimensioned to snugly fit over and substantially enclose said heater element and to be supported thereby, a shaft rotatively supported by said casing, a bimetallic thermal responsive element secured between said shaft and casing within the casing between the legs of the U-shaped heater element for causing rotation of said shaft in response to heating of said spiral and means for indicating the extent of rotation of said shaft.

4. A thermal meter comprising a U-shaped supporting framework formed of a flat strip of conductor material constituting the electric heater element of the meter and having terminals at its extremities for supporting the meter and connecting it into an electric circuit, a casing of insulating material dimensioned to slide snugly over and substantially enclose said heater element and to be supported thereby, a shaft extending between the legs of the heater element and rotatively supported by said casing, a pointer on said shaft within the casing, a slit in the wall of said casing adjacent the yoke portion of the U-shaped conductor through which slit the pointer extends, the yoke of the U-shaped conductor being off-set out of the way of such pointer, a scale adjacent such slit on which the pointer indicates, a bimetal thermal responsive spiral within said casing for rotating said shaft in one direction in response to the heating of such spiral and a second bimetal spiral external of said casing for opposing such rotation of said shaft in response to the heating of said second spiral, said spirals being connected between said shaft and casing.

WILLIAM D. HALL.